United States Patent [19]

Czerwiec et al.

[11] Patent Number: 5,161,152
[45] Date of Patent: Nov. 3, 1992

[54] HIGH-SPEED SYNCHRONOUS TRANSMISSION LINE ACCESS TERMINAL

[75] Inventors: Richard M. Czerwiec, Raleigh; Raymond E. Tyrrell, Wake Forest; Gus C. Sanders, Raleigh; Joseph E. Sutherland, Raleigh; Richard J. Sanders, Jr., Raleigh; Claude M. Hurlocker, Raleigh; Hal A. Thorne, Wendell; V. Paul Runyon, Raleigh; Enn Aro, Raleigh, all of

[73] Assignee: Alcatel Network Systems, Inc., Richardson, Tex.

[21] Appl. No.: 452,291

[22] Filed: Dec. 15, 1989

[51] Int. Cl.⁵ .............................................. H04J 3/02
[52] U.S. Cl. .................................... 370/84; 370/58.1
[58] Field of Search ............... 370/84, 58.1, 68, 110.1, 370/85.1

[56] References Cited

U.S. PATENT DOCUMENTS

| | | | |
|---|---|---|---|
| 4,530,093 | 7/1985 | Akram et al. | 370/58.1 |
| 4,627,047 | 12/1986 | Pitroda et al. | 370/110.1 |
| 4,716,561 | 12/1987 | Angell et al. | 370/84 |
| 4,733,390 | 3/1988 | Shirakawa et al. | 370/95.1 |
| 4,768,188 | 8/1988 | Barnhart et al. | 370/84 |
| 4,967,405 | 10/1990 | Upp et al. | 370/1 |
| 5,014,268 | 5/1991 | Tyrrell et al. | 370/68 |

OTHER PUBLICATIONS

S. Morita et al., "Elastic Basket Switching—A New Integrated Switching System for Voice and High-Speed Burst Data", International Switching Symposium 1987, Mar. 87, pp. 545–549.

P. Kretsch et al., "A Digital Cross-Connect System for Digital Data Circuits", IEEE Journal on Selected Areas in Communication vol. SAC-5, No. 1 Jan. 1987, pp. 26–32.

Primary Examiner—Stephen Chin
Assistant Examiner—Min Jung
Attorney, Agent, or Firm—Ware, Fressola, Van Der Sluys & Adolphson

[57] ABSTRACT

A terminal for a telecommunications system provides access to one or two high-speed synchronous transmission lines by both low-speed transmission lines and subscriber lines. A core module includes interfaces to the high-speed lines, a time slot interchanger, an interface to the low-speed transmission lines, processors and overhead circuitry for supporting the terminal. An access module includes a plurality of line shelves connected to subscriber lines, each line shelf includes a pair of processors and for time slot assignors. A multi-link serial bus connects the time slot interchanger to the access module and to the low-speed interface and provides close coupling between the processors in the core module and the line shelves. The processors cooperate to groom subscriber information from said subscriber lines to and from time slots in said high-speed feeder line and said low-speed transmission line. Subscriber information may also be groomed between time slots of the high-speed feeder line and the low-speed transmission lines and between time slots within each subscriber line.

34 Claims, 5 Drawing Sheets

HIGH-SPEED SYNCHRONOUS TRANSMISSION LINE ACCESS TERMINAL

BACKGROUND OF THE INVENTION

1. Field of the Invention

The present invention relates to telecommunication network systems and, more particularly, to a terminal for such a system wherein a high-speed synchronous transmission line may be accessed by individual subscriber lines.

2. Description of the Prior Art

The Synchronous Optical Network (SONET) standard (American National Standards Institute Standard T1.105-1988 entitled "Digital Hierarchy Optical Interface Rates and Formats Specification") which is being adopted within the United States and elsewhere defines the standard for the transfer of information by means of optical fiber. According to the SONET standard, an optical carrier level (such as OC1, OC3, OC12 and OC48) signal is a signal that results from an optical conversion of a synchronous transport signal (STS) operating at the same transfer rate. An STS1 level signal is defined as the basic building block signal, with a high-speed transfer rate of 51.840 Mb/s, and is equated to an OC1 level optical signal. With high-speed transfer rates there is a need for multiplexing and demultiplexing information associated with lower-speed telephony standards to and from the high-speed transmission lines. Examples of such low-speed standards include the digital signal standard, or DSX standard (where 'X' is an integer, such as 0, 1, 2 and 3). The DSX standard is commonly used in telephony with DS0 directed to subscriber level signals that operate at 64 Kb/s, DS1 directed to lines operating a 1.544 Mb/s, DS2 operating at 6.312 Mb/s, and DS3 operating at 44.736 Mb/s.

In order to access the high-speed transmission lines, network elements are required for transferring and grooming, i.e., segregating subscriber information channels between the lower-speed transmission lines and the higher-speed transmission lines. These network elements may take on several different forms for providing transfer of information between various standard transmission rates. In order to take advantage of the wider bandwidth available on the high-speed lines for various applications such as data transfer, a means was required to combine DS0 channels to provide wider band facilities.

A family of access products has been developed by the Assignee of the present invention. These access products allow slower transmission lines to access the higher-speed optical transmission systems. These access products use an internal multi-link serial bus operating at a rate of 4.096 Mb/s to transport information, signalling and processor commands. U.S. patent application Ser. No. 351,458 filed May 12, 1989 and entitled "Serial Transport Frame Format Method" describes this unique serial bus and is incorporated herein by reference. Two access products are also described in the aforementioned patent application, said access products being a Terminal Multiplexer, adapted to interface a high-speed carrier with DS1 level transmission lines for reception and transmission of high-speed signals from and to one direction only. An Add/Drop Multiplexer (ADM) is also described in the aforementioned patent application and is designed to interface a high-speed carrier to DS1 level transmission lines for reception and transmission in each of two directions.

FIG. 1 illustrates the use of access products in a telephone transmission system. Two feeder lines 10 and 12 are shown as being at the optical OC1 level and the electrical STS1 level respectively. Both of these feeder lines operate at 51.84 Mb/s. An add/drop multiplexer 14, as described in the aforementioned copending patent application, connects either feeder line 10 or 12 to a DS1 level transmission line 16 operating at 1.544 Mb/s. In order to extract individual DS0 channels from the DS1 line, a separate network element 15 usually referred to as a DLC was required as an interface between the DS0 level and the DS1 level. In a commercial installation several DLCs would be used with each add/drop multiplexer.

Thus, two separate network elements 14 and 15 were required in order for individual lines at the DS0 level to access an optical OC1 level transmission line, and in most cases several DLCs were used with one multiplexer. Each of these individual network elements required a certain number of overhead components, such as clock circuits, a microprocessor, craft interface, an order wire, ring generators, alarm facilities and power supplies, thereby replicating a large amount of circuitry in each of the network elements. This practice consumed much valuable board space, used excessive amounts of power and increased costs significantly. The use of separate craft interfaces for each network element required the training of craftspersons on the use and operation of two or more different network elements, thereby creating training and logistical problems.

The need for a DS1 level transmission line between the ADM 14 and the DLC 15 severely limited the control communications that could take place between the two network elements. The use of two separate network elements inherently reduced reliability, since all control information had to be conveyed over a single DS1 line. Control information in the form of signaling could be conveyed only to a limited extent using the robbed bit signaling technique and clear channel communication was not available. A means did not exist for the microprocessors in each element to communicate with each other unless a separate DS0 level channel was used for this purpose, removing this particular DS0 channel from the pool of DS0 channels available to carry subscriber traffic.

From the above, it is apparent that there was a need for a more efficient way of providing access to the high-speed transmission lines by a DS0 subscriber line.

SUMMARY OF THE INVENTION

The present invention contemplates a single network element which will interface a high-speed feeder transmission line 10 or 12 with lower-speed DS1 lines 16 and DS0 subscriber lines 20. Referring to FIG. 1, there is shown an access terminal 22 having a core module 24 connected to either feeder line 10 or 12 and having outputs connected to the DS1 lines 16 and to an access module 26 having an output connected to DS0 lines 20.

It is contemplated that the access module 26 may comprise a plurality of individual line shelves, each of which may further accommodate a plurality of line units for connection to individual subscriber lines. Each line shelf may accommodate up to 96 subscriber lines, with the core module 24 accommodating up to seven line shelves, for a total of 672 subscriber lines, each having access to an optical fiber carrier OC1 or an STS1 metallic feeder line.

The core module 24 is connected to the line shelves of the access module 26 by a plurality of serial buses, as disclosed in the aforementioned U.S. patent application Ser. No. 351,458. The serial buses facilitate an embedded control technique for communicating control messages. This embedded control technique is described in U.S. patent application Ser. No. 349,716 filed May 10, 1989, entitled "Embedded Control Technique for Distributed Control Systems", now U.S. Pat. No. 5,027,349 which is commonly assigned with this application and is incorporated herein by reference. The serial bus using the embedded control technique allows the DS0 level signals to be tightly coupled to the high-speed OC1 or STS1 feeder lines. The technique allows for clear channel transmission by eliminating the need for the robbed bit technique and also provides for processor-to-processor communication. The flexibility of the serial bus arrangement facilitates the signaling processing, provisioning and maintenance functions.

The single-core module 24 is provided with many of the overhead components such as a craft interface for accessing one network element serving up to 672 subscriber lines. The clock and ring circuits are provided in the core module for servicing all of the subscriber line interface cards plus common function cards (clock only) within the line shelves.

A pair of processors are provided in the core module, with one processor being redundant. Two processors are in each of the line shelves, each processor operating at about half capacity and capable of handling the other processor's load if it should fail. These processors are directly connected through the serial bus so as to provide extensive processor-to-processor communication between the core and the line shelves. A second redundant serial bus is provided, thereby greatly enhancing the overall reliability of the system by not relying on a single DS1 line for element-to-element communication.

The use of processors in the line shelves provides a host of advantages which will become apparent. One advantage is the unique flexibility provided in grooming DS0 channels and the ability to combine them to provide wider bandwidth capability to service future communications needs such as ISDN. Another advantage of using a line shelf processor lies in its adaptability to future enhancements and reconfigurations by merely effecting a software change.

Thus, the access terminal of the present invention provides east and west high-speed ports which may interface with STS1 or OC1 level feeder lines. A low-speed interface supports up to 28 DS1 low-speed ports operating in either synchronous or asynchronous fashion. The terminal provides DS1 and/or DS0 level access to the SONET transmission system at full capacity. The terminal also interfaces DS0 channels between two DS1 ports, between a DS1 port and DS0 subscriber lines, and between DS0 subscriber lines and the SONET feeders via a time slot interchanger, as described in U.S. patent application Ser. No. 295,887, filed Jan. 11, 1989, entitled "Parallel Time Slot Interchanger Matrix and Switch Block Module for Use Therewith", now U.S. Pat. No. 5,014,268 which is commonly assigned with the present invention and is incorporated herein by reference. Thus, the terminal can route any synchronous DS0 channel to any east or west SONET payload time slot and, in addition, can route any DS0 channel to a low-speed DS1 time slot.

A primary objective of the present invention is to provide direct access for residential and business subscribers to high-speed synchronous digital fiber optic broad band feeder facilities, or to a DS1 level T1 metallic feeder plant.

Another objective of the present invention is to provide a single network element that allows for grooming of DS0 subscriber lines directly to a high-speed electrical or optical feeder line.

Another objective of the present invention is to provide connection between high-speed ports and low-speed ports all at full capacity.

Another objective of the present invention is to provide a system wherein DS0 lines are tightly coupled to the high-speed feeder lines so as to achieve greater reliability and control flexibility.

Another objective of the present invention is to provide subscribers the benefit of the broad band capability of optical carriers by providing a means to combine DS0 channels.

Another objective of the present invention is to provide a terminal that is adaptable to future enhancements, reconfigurations and new line card functions by only changing a software load.

Another objective of the present invention is to provide a network element with reduced overhead equipment through the use of a single core module for serving the needs of a plurality of line shelves.

Another objective of the present invention is to provide clear channel control for all channels carrying a DS0 level signal across a transmission level boundary.

Another objective of the present invention is to provide grooming of DS0 and DS1 channels to and from specific tributary SONET payload segments of the high-speed SONET ports, or between individual DS1 ports of the network element.

Another objective of the present invention is to provide add/drop multiplexer capability for a number of DS1 channels being provided between the east and west paths of a SONET transport pipe in the core module.

DETAILED DESCRIPTION OF THE PRESENT INVENTION

Figure 1:
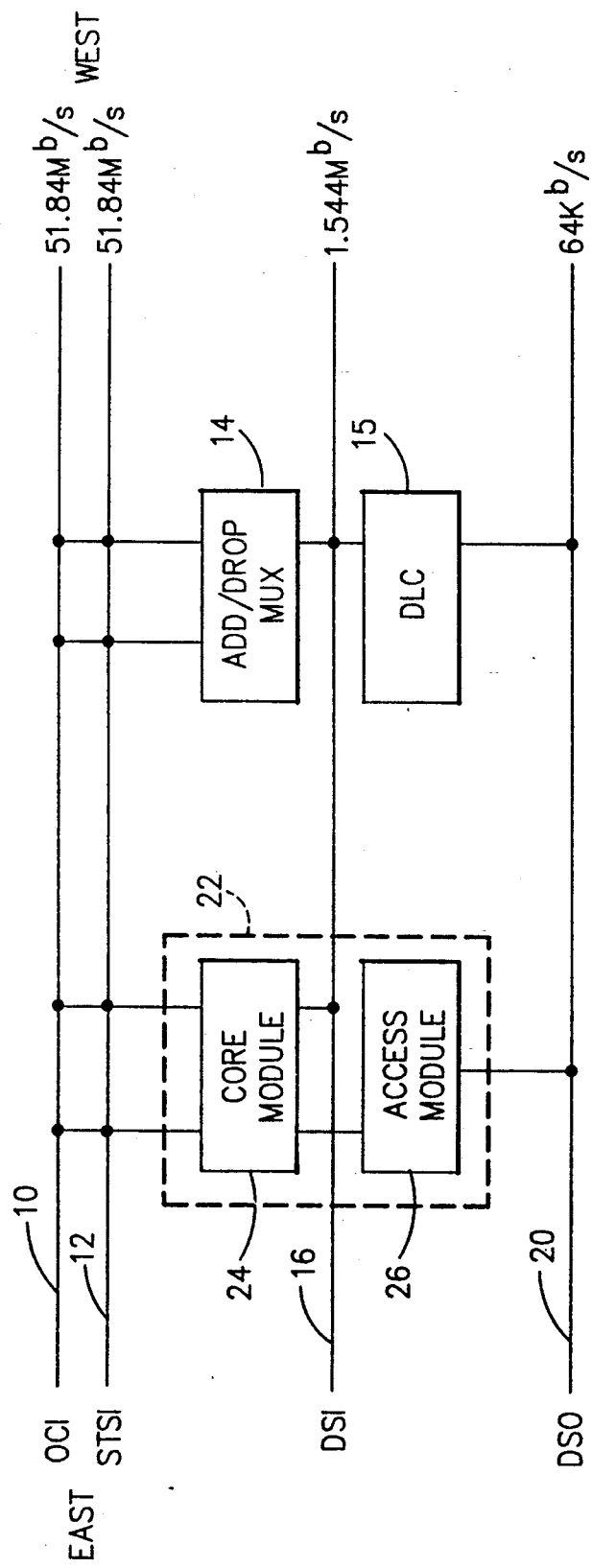
FIG. 1 is a block diagram illustrating the connectivity of the present invention as compared to the prior art.

Referring to FIG. 1, there is shown an access terminal 22 of the present invention connected between feeder line 10 or 12 carrying respectively OC1 optical fiber signals and STS1 electronic signals and a low-speed line 16 carrying DS1 signals and DS0 level subscriber lines 20.

Figure 2:
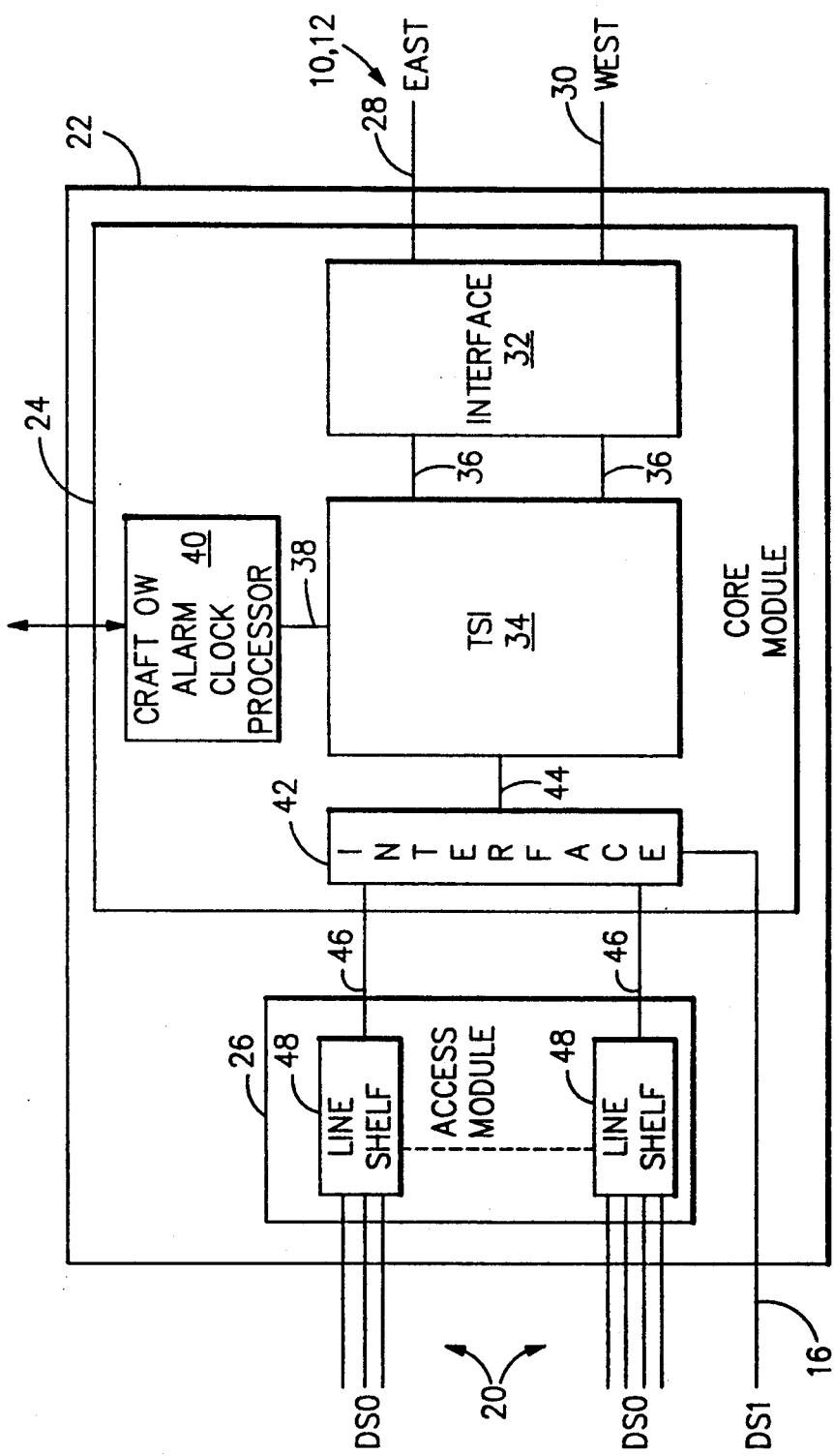
FIG. 2 is a block diagram of the access terminal of the present invention.

Referring to FIG. 2, there is shown a block diagram of the access terminal 22 of the present invention. The core module 24 is shown connected to high-speed feeder line 10, 12 which may be either an OC1 optical transmission line or an STS1 electrical transmission line. The feeder line includes a line 28 connected in the east direction and a line 30 connected in the west direction. The lines are connected to a feeder interface 32 which is further connected to a time slot interchanger 34 through parallel buses 36. The time slot interchanger 34, interface 32 and parallel buses 36 are constructed in accordance with the teachings of the previously-mentioned applications. The time slot interchanger 34 is connected via buses 38 to control and interface circuitry 40, which includes control processor, clock circuits, a craft interface, order wire and alarm interfaces. The time slot interchanger 34 is further connected to interface circuitry 42 via serial buses 44. Interface 42 provides DS1 outputs to transmission line 16 and further has outputs connected via serial buses 46 to the access module 26 which includes a plurality of line shelves 48, each of which is connected to a plurality of DS0 subscriber lines 20.

Figure 3:
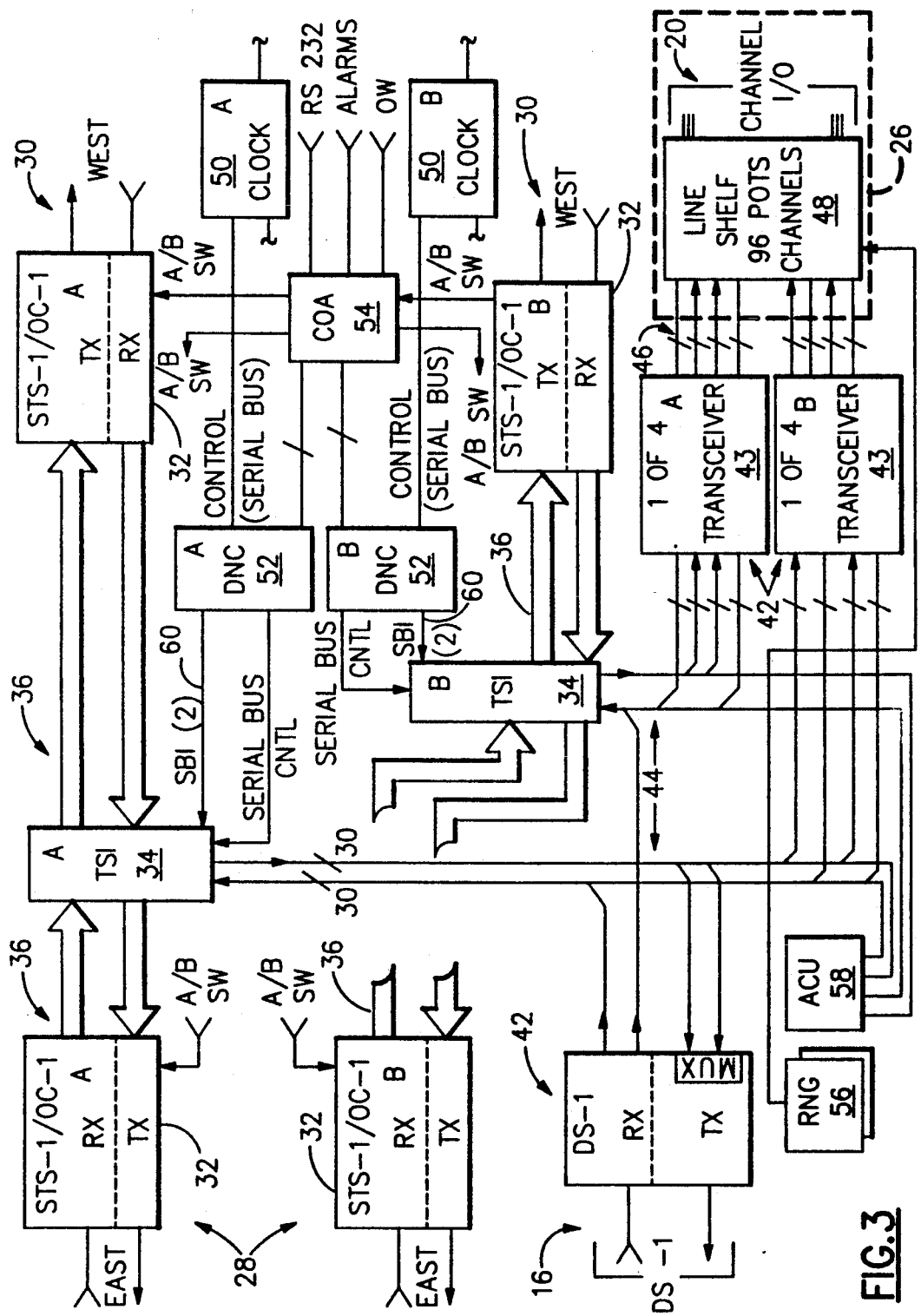
FIG. 3 is a block diagram of a core module of the present invention.

Referring to FIG. 3, there is shown a detailed block diagram of the core module 24 which is constructed in a manner substantially similar to the add/drop multiplexer shown and described in the aforementioned U.S. patent application Ser. No. 351,458. The difference between core module shown in FIG. 3 and the add/drop multiplexer shown in the aforementioned patent application is that the core module is equipped with redundant controllers 52, TSIs 34 and ring generators 56. The module is provided with additional access module interfaces 42 in the form of serial bus transceivers 43 and an optional alarm communications unit 58.

The core module includes two high-speed ports 32 connected to two east high-speed feeder lines 28 and two west high-speed feeder lines 30 for receiving and transmitting in both the east and west directions. One set of ports 32 and feeder lines is redundant and is usually on standby. The interfaces 32 may be either OC1 or STS1 interfaces. Interface 42 includes a number of low-speed DS1 level ports which may include 1-28 separate DS1 interfaces. Interface 42 further includes two access module interfaces in the form of serial bus transceivers 43, one of which is redundant. Transceivers 43 merely condition the serial bus signals for transmission to the line shelves, which may be a few feet away in a different shelf position of the same rack. The interfaces 42 are connected to the high-speed ports 32 via serial buses 44, time slot interchangers 34 and parallel buses 36. The craft interface, order wire, alarms, clocks and processor 40 of FIG. 2 includes two clocks 50 and two controllers 52, one of each being redundant, a craft interface, order wire and alarm circuit 54, two ring generators 56, one of which is redundant, and an alarm communications unit 58. The controllers monitor the system performance and provide AB switch status information to the craft interface, order wire and alarm circuit 54 which determines whether the A or B side of the duplicated portions should be active.

The core module provides DS1 grooming and is capable of routing any of the 28 DS1 low-speed ports to the appropriate location in the SONET payload. In addition, the core module can provide DS0 grooming to both the DS1 lines and the SONET payload. In addition, the core module can groom from east to west and west to east between the high-speed ports or groom east to east or west to west on the same high-speed port.

The buses 36 are parallel buses connected between interfaces 32 and the time slot interchangers 34 and operate at a rate of 8.192 Mb/s. The serial buses 44 operate at a rate of 4.096 Mb/s and comprise 32 channels, with each channel containing 16 bits. The capacity of the serial buses is such that clear channel communication plus signaling and control information for each DS0 channel is provided between the high-speed transmission lines and the DS0 subscriber lines, with the high-speed interfaces 32 and the line shelves 48 being tightly coupled. The use of a redundant time slot interchanger 34 and a redundant serial bus 44 provide for increased reliability in an integrated message system.

The controllers 52 provide system performance monitoring, control alarm reporting and provisioning for the network element. The controllers consist of a microprocessor, program memory and a local memory. The primary system of non-volatile memory is located in the craft interface, order wire alarm circuit 54. The controllers 52 communicate to the interfaces via two serial buses 60 similar to the serial buses 44.

The ring generators 56 operate from station batteries and provide the ringing voltage required by the line shelves 48. The core module is provided with two ring generators for servicing all line shelves.

Figure 4:
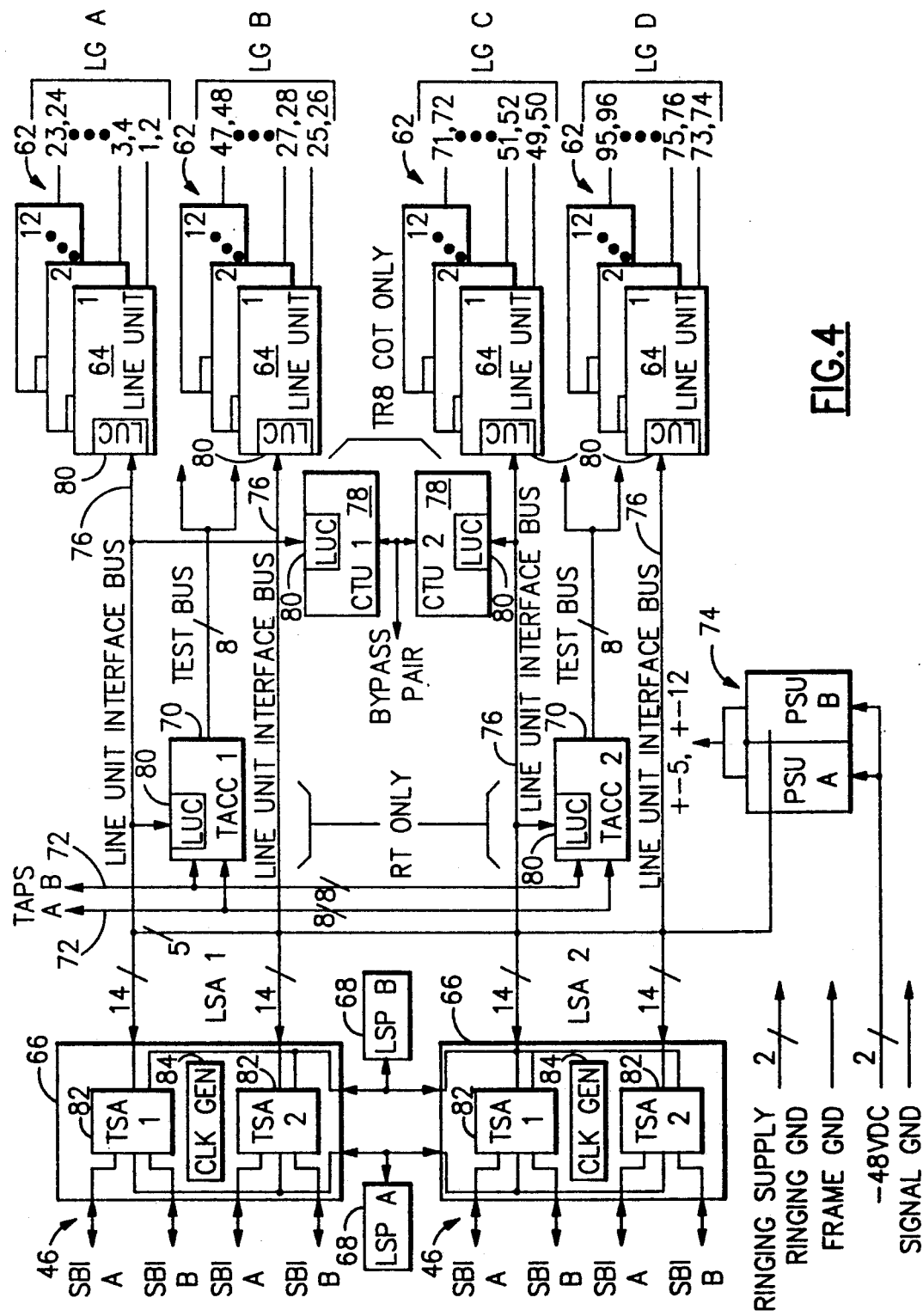
FIG. 4 is a block diagram of a line shelf of the present invention.

Referring to FIG. 4, there is shown a block diagram of a line shelf 48 as used in the access module 26. Each line shelf is arranged in four groups 62 of subscriber line outputs at the DS0 level. Each of the groups includes 12 line units 64, most units are capable of handling one or two subscriber lines so that a maximum total of 96 subscriber lines may be handled by a line shelf. A pair of line shelf access units 66 are arranged to each service two of the groups 62 of subscriber lines and function to multiplex the DS0 channels of these groups to a pair of serial buses 46. Two line shelf processors 68 are provided to control the line shelf access units 66, with each processor having sufficient capacity to control the entire line shelf in the event of failure of the other processor. Thus, in normal operation both processors work at less than full capacity. In the event of a failure, one processor can service the line shelf with only slightly degraded service.

Each of two test access units 70 provide full test-in, test-out, monitor and split-test access for two of the groups 62 of subscriber lines. Each test access unit 70 provides test access to either of two test access paths 72. One test access path is a two-wire test access path for two-wire circuits, and the other test access path is a six-wire test access path for two-, four- or six-wire circuits. The test access units also monitor talk battery and ring voltage presence and reports to processor.

A pair of power supplies 74 are also provided, one being redundant.

Channel test unit 78, which is only required in one a central office terminal line shelf of a 672 line system, provides an interface between the digital loop carrier and the pair gain test controller. The channel test unit 78 provides test trunk access to the bypass pair for testing the subscriber loop if metallic bypass pair methods are used.

The line shelf access units 66 are connected to the various line units 64 via line unit interface buses 76. The line unit interface buses 76 interface with a line unit controller 80 provided in each of the line units 64, the test access units 70 and the channel test unit 78. The line unit controllers 80 perform all the functions necessary to access the line unit interface buses 76 with the various interface or common function cards used in the line shelf. The operation of the line unit controller is more fully described in U.S. patent application Ser. No. 451,436 filed on even date herewith and entitled "Line Unit Interface Circuit", now U.S. Pat. No. 4,993,019 which application is incorporated herein by reference and is commonly assigned with the present application.

The line shelf access units 66 each include two time slot access circuits 82 and a clock generator 84. The time slot access circuits are connected to each line shelf processor 68 and perform most of the functions of the line shelf access units 66. The structure and function of the time slot access unit 82 is described in detail in U.S. patent application Ser. No. 451,419 entitled "Apparatus for Programmably Accessing and Assigning Time Slots in a Time Division Multiplexed Communication System", filed on even date herewith and commonly assigned to the Assignee hereof. The subject matter of said application is incorporated herein by reference.

The time slot access circuits 82 serve two significant functions: firstly, time slot access; and secondly, time slot assignment. The time slot access function gives the line shelf processor direct access to data in any time slot, which data can be monitored, extracted, replaced or inserted. This access function is a powerful tool, the benefits of which are more clearly set forth in the aforementioned application entitled "Apparatus for Programmably Accessing and Assigning Time Slots in a Time Division Multiplexed Communication System". The time slot assignor function allows the system to allocate any one or more time slots to a subscriber line. A group of adjacent time slots can be assigned to a single line, thereby providing it with a wider bandwidth.

Thus, the line shelf is capable of supporting 96 DS0 level subscriber lines; however, using the time slot assignor function the line shelf can support higher bandwidth interfaces by combining individual DS0 channels, to the extent that 24 DS0 channels may be combined to provide a bandwidth of 1.536 Mb/s to service a single line.

Figure 5:
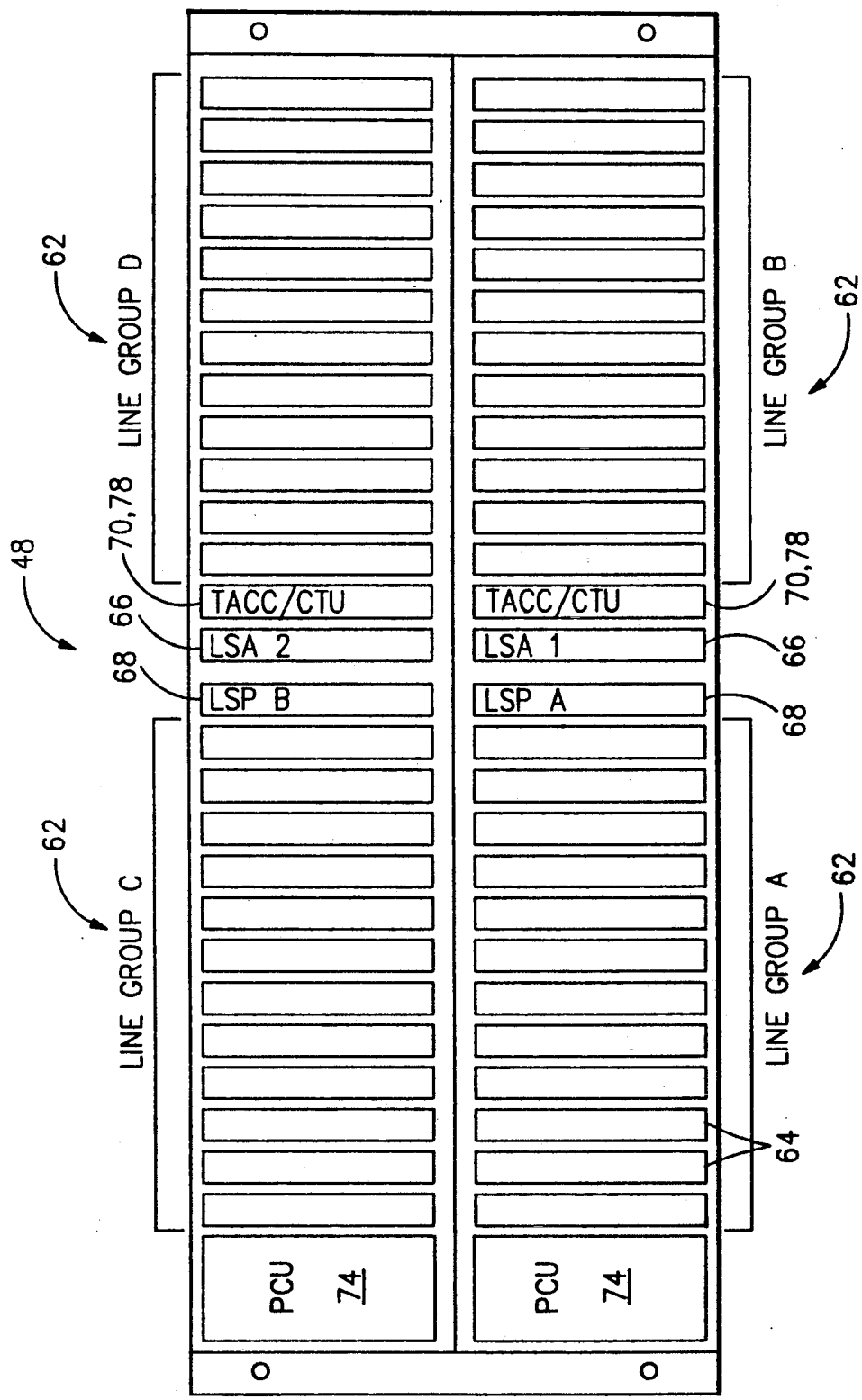
FIG. 5 is a front view of a line shelf of the present invention showing the physical construction and arrangement of the components of the line shelf.

Referring to FIG. 5, there is shown the structural configuration of a line shelf 48 which is constructed with a back plane connector array and slots for receiving various plug-in units. The line shelf includes two redundant power supplies 74, two line shelf processors 68, two line shelf access units 66 and two test access units 70 if the line shelf is used at a remote terminal, or in lieu thereof, a channel test unit 78 if the line shelf is used at a central office terminal. A total of 48 line units 64 are provided in four groups of 12 each.

From the above, it is seen that the present invention provides a high-speed synchronous transmission line access terminal in the form of a single network element that provides an interface between high-speed transmission lines (whether they be optical OC1 lines or electrical STS1 lines), low-speed DS1 lines and individual DS0 subscriber lines. Thus, direct access to high-speed synchronous digital broad band feeder facilities is provided for residential and business subscribers. The invention provides connectivity and grooming between OC1 or STS1 level channels, DS1 channels and individual subscriber lines. Only a single craft interface port is required for controlling the entire network element, and overhead circuitry is reduced to an absolute minimum by combining many of the overhead functions into the core module. Local intelligence is provided at the line shelf but is tightly coupled to the controllers contained in the core module for greater flexibility and control of signal processing, provisioning and maintenance. DS0 functionality is provided in the core element.

The present invention provides a degree of control and flexibility not heretofore realized in a single network element that has greater reliability than the devices of the prior art.

What is claimed is:

1. A telecommunications terminal for interfacing a high-speed synchronous feeder line with subscriber lines, said terminal comprising:

high-speed interface means for receiving and transmitting high-speed synchronous formatted information from and to time slots in a high-speed feeder line;

subscriber line interface means for receiving and transmitting subscriber information from and to subscriber lines;

time slot interchanging means disposed between said high-speed interface means and subscriber line interface means for interconnecting said interface means and for interchanging subscriber information between time slots of said interface means;

first bus means for connecting the high-speed interface means with said time slot interchanging means; and second bus means connecting said time slot interchanging means to said subscriber line interface means for conveying subscriber information therebetween in time slots.

2. A telecommunications terminal as described in claim 1, wherein said second bus means comprises a plurality of serial buses each conveying serial bit streams.

3. A telecommunications terminal as described in claim 2, wherein said second bus means operates at a rate of 4.096 Mb/s.

4. A telecommunications terminal as described in claim 3, wherein said second bus means conveys 32 channels with 16 bits per channel.

5. A telecommunications terminal as described in claim 1, wherein said first bus means comprises a plurality of parallel lines for conveying in parallel a plurality of data bits and address bits at a rate of 8.192 Mb/s.

6. A telecommunications terminal as described in claim 1 for interfacing two high-speed synchronous feeder lines, which lines extend in two directions from the terminal, wherein said high-speed interface means comprises four separate high-speed interface means for interfacing the two high-speed feeder lines extending in the two directions from the terminal.

7. A telecommunications terminal as described in claim 6, wherein the time slot interchanging means comprises two time slot interchanging means, said first bus means comprises four bus means for connecting each high-speed interface means to an associated time slot interchanging means, and said second bus means includes two bus means each connecting a time slot interchanging means to the subscriber line interface means.

8. A telecommunications terminal as described in claim 7, wherein said time slot interchanging means additionally includes a pair of controllers.

9. A telecommunications terminal as described in claim 8, wherein said time slot interchanging means additionally comprises a craft interface, an order wire and alarm circuits for said terminal.

10. A telecommunications terminal as described in claim 1, wherein the high-speed synchronous format is at an OC1 or STS1 level, and the subscriber line is at a single or multiple DS0 level.

11. A telecommunications terminal as described in claim 1, wherein the terminal is adapted to also interface with at least one low-speed transmission line and additionally comprises a low-speed interface means for receiving and transmitting low-speed formatted information from and to time slots in at least one low-speed transmission line, said time slot interchanging means disposed between said high-speed, low-speed and subscriber line interface means and said second bus means being connected to said low-speed interface means.

12. A telecommunications terminal for interfacing a high-speed synchronous feeder line with subscriber lines, said terminal comprising:
a core module including high-speed interface means for receiving and transmitting high-speed synchronous formatted information from and to time slots in a high-speed synchronous feeder line; a time slot interchanging means having first and second ports for connection to a first and a second bus means for interchanging subscriber information received in time slots on said first and second ports; said first bus means for connecting the high-speed interface means with the first port of said time slot interchanging means; said second bus means connected to a second port of said time slot interchanging means for conveying subscriber information therebetween in time slots on said bus means; and controller means for controlling said time slot interchanging means and for providing commands to be transmitted on said first and second bus means; and
an access module for receiving and transmitting subscriber information to and from subscriber lines, said access module being connected to said second bus means for receiving subscriber information and commands therefrom.

13. A telecommunications terminal as described in claim 12, wherein said second bus means comprises a plurality of serial buses each conveying serial bit streams.

14. A telecommunications terminal as described in claim 13, wherein said second bus means operates at a rate of 4.096 Mb/s.

15. A telecommunications terminal as described in claim 14, wherein said second bus means conveys 32 channels with 16 bits per channel.

16. A telecommunications terminal as described in claim 12, wherein said first bus means comprises a plurality of parallel lines for conveying in parallel a plurality of data bits and address bits at a rate of 8.192 Mb/s.

17. A telecommunications terminal as described in claim 12 for interfacing two high-speed synchronous feeder lines, which lines extend in two directions from the terminal, wherein said high-speed interface means comprises four separate high-speed interface means for interfacing the two high-speed feeder lines extending in two directions from the terminal.

18. A telecommunications terminal as described in claim 17, wherein the time slot interchanging means comprises two time slot interchanging means, said first bus means comprises four bus means for connecting each high-speed interface means to an associated time slot interchanging means, and said second bus means includes two bus means each connecting a time slot interchanging means to the access module.

19. A telecommunications terminal as described in claim 18, wherein said core module includes a pair of controllers.

20. A telecommunications terminal as described in claim 19, wherein said core module additionally comprises a craft interface, an order wire and alarm circuits for said terminal.

21. A telecommunications terminal as described in claim 12, said terminal being adapted to also interface with at least one low-speed transmission line, said core module additionally including a low-speed interface means for receiving and transmitting low-speed formatted information from and to time slots in at least one low-speed transmission line, said second bus means connected to said low-speed interface means.

22. A telecommunications terminal for interfacing a high-speed synchronous feeder line with subscriber lines, said terminal comprising:
high-speed interface means for receiving and transmitting high-speed synchronous formatted information from and to time slots in a high-speed feeder line;
subscriber line interface means for receiving and transmitting subscriber information from and to subscriber lines;
time slots interchanging means disposed between said high-speed and subscriber line interface means for interconnecting said interface means and for interchanging subscriber information between time slots of said interface means;
first bus means for connecting the high-speed interface means with said time slot interchanging means; and
second bus means connecting said time slot interchanging means to said subscriber line interface means for conveying subscriber information therebetween in time slots, said subscriber line interface means comprising a line shelf including a plurality of line units for connection to subscriber lines, time slot assignor means, connected to said second bus means, for assigning a time slot of said second bus means to a subscriber line, processor means connected to said time slot assignor means for controlling said time slot assignor, and line unit interface bus means connecting said time slot assignor means to said line units.

23. A telecommunications terminal as described in claim 22, wherein said line shelf further includes test access means, connected to said line unit interface bus means, for providing system test capability, talk battery monitoring and presence of ring voltage on the line shelf.

24. A telecommunications terminal as described in claim 22, wherein the subscriber line interface means comprises a plurality of line shelves.

25. A telecommunications terminal as described in claim 22, wherein the line units are divided into a predetermined number of groups, said line shelf further comprising:
a predetermined number of time slot assignors, one associated with each of said groups;
a predetermined number of line unit interface buses connecting said time slot assignors to the line unit of the associated group; and
a pair of processor means each connected to all said time slot assignors.

26. A telecommunications terminal as described in claim 22, wherein said time slot assignor means additional provides time slot access for said processor means, whereby information in said time slot can be accessed, controlled and modified by said processor.

27. A telecommunications terminal as described in claim 22, additionally comprising transceiver means disposed in said second bus means between the time slot interchanging means and said subscriber line interface means for conditioning subscriber information on said second bus means for transmission to and from the subscriber line interface means.

28. A telecommunications terminal as described in claim 22, wherein the time slot assignor means assigns a plurality of time slots to a subscriber line to provide multiple DS0 level bandwidth to the subscriber line.

29. A telecommunications terminal for interfacing a high-speed synchronous feeder line with subscriber lines, said terminal comprising:

a core module including high-speed interface means for receiving and transmitting high-speed synchronous formatted information from and to time slots in a high-speed synchronous feeder line, a time slot interchanging means having first and second ports for connection to a first and a second bus means for interchanging subscriber information received in time slots on said first and second ports, said first bus means for connecting the high-speed interface means with the first port of said time slot interchanging means, said second bus means connected to a second port of said time slot interchanging means for conveying subscriber information therebetween in time slots on said second bus means, and controller means for controller said time slot interchanging means and for providing commands to be transmitted on said first and second bus means; and an access module for receiving and transmitting subscriber information to and from subscriber lines, said access module being connected to said second bus means for receiving subscriber information and commands therefrom, said access module comprises at least one line shelf, said line shelf including a plurality of line units for connection to subscriber lines, time slot assignor means, connected to said second bus means for assigning a time slot of said second bus means to a subscriber line, processor means connected to said time slot assignor means for controlling said time slot assignor, and line unit interface bus means connecting said time slot assignor means to said line units.

30. A telecommunications terminal as described in claim 29, wherein said line shelf further includes test access means, connected to said line unit interface bus means, for providing system test capability, talk battery monitoring and presence of ring voltage on the line shelf.

31. A telecommunications terminal as described in claim 29, wherein the line units are divided into a predetermined number of groups, said line shelf comprising:

a predetermined number of time slot assignors, one associated with each of said groups;

a predetermined number of line unit interface buses connecting said time slot assignors to the line units of the associated group; and a pair of processor means each connected to all said time slot assignors.

32. A telecommunications terminal as described in claim 29, wherein said time slot assignor means additionally provides time slot access for said processor means, whereby information in said time slots can be accessed, controlled and modified by said processor.

33. A telecommunications terminal as described in claim 29, wherein the core module additionally comprises transceiver means disposed in said second bus means between the time slot interchanging means and said access module for conditioning information on said second bus means for transmission to and from the line shelf.

34. A telecommunications terminal as described in claim 29, wherein the time slot assignor means assigns a plurality of time slots to a subscriber line to provide multiple DS0 level bandwidth to the subscriber line.

* * * * *

UNITED STATES PATENT AND TRADEMARK OFFICE
CERTIFICATE OF CORRECTION

PATENT NO. : 5,161,152
DATED : November 3, 1992
INVENTOR(S) : Czerwiec et al

It is certified that error appears in the above-identified patent and that said Letters Patent is hereby corrected as shown below:

On the title page,
    Item [75]    after line 8, please insert --North Carolina--.

Item [57]    at line 11, please change "for" to --four--.

column 10, lines 63 and 64, please change "additional" to --additionally--.

column 11, line 27, please change "controller said" to --controlling said--.

Signed and Sealed this

Twenty-sixth Day of October, 1993

Attest:

BRUCE LEHMAN

*Attesting Officer*    *Commissioner of Patents and Trademarks*